April 15, 1969   Z. J. KISS   3,438,881
METHOD OF PREPARING LUMINESCENT MATERIALS
Filed April 30, 1963
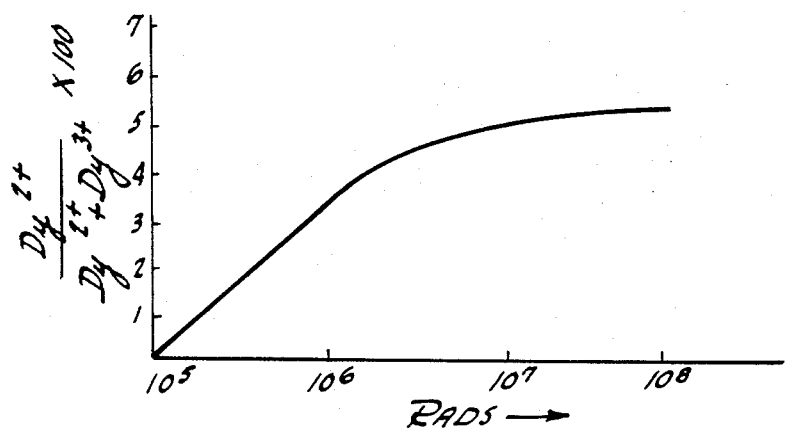
INVENTOR.
ZOLTAN J. KISS
BY
W.S. Hill
AGENT 3,438,881
METHOD OF PREPARING LUMINESCENT MATERIALS
Zoltan J. Kiss, Trenton, N.J., assignor to Radio Corporation of America, a corporation of Delaware
Filed Apr. 30, 1963, Ser. No. 276,764
Int. Cl. B01j 1/10
U.S. Cl. 204—157.1     4 Claims This invention relates to a method for preparing luminescent materials and particularly to producing divalent lanthanide (rare earth) cations in an alkaline earth halide host material.

When lanthanide (rare earth) cations are introduced into an alkaline earth halide host material, such as calcium fluoride, they usually assume the trivalent or a higher oxidation state. Attempts to lower the oxidation state of the cations to the divalent state are resisted by the host material.

An object of this invention is to provide a method for producing divalent rare earth cations in an alkaline earth halide host material.

Another object is to provide a method for preparing a laser element comprising an alkaline earth halide host crystal containing divalent rare earth cations.

In practicing the method of the invention, lanthanide cations are provided in an alkaline earth halide host material which is substantially free of oxygen. One or more lanthanides may be present in proportions of 0.0001 to 1.0 mol percent of the host material. The host material containing the lanthanide cations is irradiated with gamma rays to a dosage of $1 \times 10^5$ to $5 \times 10^7$ rads, which reduces lanthanide cations to the divalent state.

The use of gamma rays is a convenient, rapid and uniform way to reduce lanthanide cations to the divalent state. The oxygen-free character of the prepared material permits this photoreduction and imparts a relatively high threshold of dosage above which color centers are formed in the material. The dosage range set forth is that range in which there is a substantial conversion of cations to the divalent state before any substantial density of color centers is formed.

A more complete description and illustrative embodiments of the invention appears below in conjunction with the drawing in which the sole figure is a graph plotting the gamma ray dosage versus the proportion of cations converted to the divalent state in $CaF_2$:0.001Dy.

The method of the invention applies to a prepared material comprising an alkaline earth halide host material containing 0.0001 to 1.0 mol percent of at least one lanthanide cation. The host material may be any single alkaline earth halide or may be homogenous mixtures thereof. The preferred halides are $CaF_2$, $BaF_2$, and $SrF_2$. Some other halides are $CaCl_2$, $CaFCl$, $CaBrI$, $BaBr_2$, $BaFBr$, $BaClI$, $SrFI$, $SrClBr$. The rare earth cations may be one or a combination of non-radioactive cations from the lanthanide series, such as lanthanum, cerium, praesodymium, and lutetium. The preferred lanthanides are samarium, dysprosium, and thulium. The lanthanide may be introduced in elemental form, or as a compound such as an oxide or fluoride. The lanthanide is preferably introduced as a halide thereof. The lanthanide is introduced into the host material in proportions of 0.0001 to 1.0 mol percent of the host material, and preferably between 0.001 to 0.1 mol percent. During the step of introducing the lanthanide into the host material, no attempt is made to control the valence state of the lanthanide. The lanthanide usually takes the trivalent or higher state.

During the step of introducing the lanthanide, the process is designed to prevent the incorporation of oxygen and also to lower the oxygen content of the material so that the prepared material is substantially free of oxygen as indicated by a lack of an absorption band at about 2000 A. This is achieved by taking precautions including (1) heating the material for a short time interval at relatively high temperatures, (2) using a non-reactive ambient atmosphere, such as helium or mixtures of helium and hydrogen, which is substantially free of oxygen and water vapor, and (3) keeping oxygen-containing materials, such as quartz and alumina out of the hot zone of the furnace. These precautions are especially important because most of the alkaline earth halides are active scavengers for oxygen. The same precautions should be observed when growing a single crystal of the prepared material. The presence of relatively large amounts of oxygen produces very fine inclusions in the prepared material causing Tyndall scattering of light. The presence of lesser but still substantial proportions of oxygen in the prepared material avoids the formation of inclusions, but adversely affects the subsequent irradiation step in the process by interfering with the reduction of the lanthanide cations to the divalent state. The presence of a substantial amount of oxygen in the prepared material prevents the reduction of the rare earth cations which are in the same vicinity in the host material. The presence of substantial amounts of oxygen also permits easier formation of color centers in the prepared material upon irradiation with gamma rays. In a crystal of the material which is to be used as a laser element, the presence of any substantial amount of oxygen in the material is undesirable because it shortens the radiative lifetime of the material.

The prepared material may be shaped and polished to a desired form. For use in a laser element, the prepared material is preferably formed to a single optically-clear crystal. In addition, opposite faces of the crystal may be polished to form a Fabry-Perot resonator.

The prepared host material is exposed to gamma rays, which is radiant energy in the wavelength range between 1.4 and 0.1 A. The use of gamma rays permits rapid and uniform conversion of the rare earth cations to the divalent state to a relatively high concentration throughout the mass of the host material. Radiation with longer wavelengths, such as X-rays, converts the cations more slowly, produces a non-uniform conversion due to a lesser energy content per photon, and a poorer penetration of the photons into the material.

Gamma rays should be used in limited dosages between $1 \times 10^5$ and $5 \times 10^7$ rads. A rad is the unit of absorbed dose which is 100 ergs per gram. It is a measure of the energy imparted to the prepared material by ionizing radiation per unit mass of irradiated material at the place of interest. Using less than about $1 \times 10^5$ rads, few of the rare earth cations are converted to the divalent state. On the other hand, using more than about $5 \times 10^7$ rads produces radiation damage as evidenced by the formation of color centers in the material. The useful range of irradiation dosage is further limited by the fact that the saturation ratio (the number of divalent lanthanide cations relative to the total number of lanthanide cations per unit volume) saturates at a radiation level of about $10^7$ rads, as shown in the sole figure for the $CaF_2$:0.001$Dy^{2+}$ system, in which the ratio saturates at about 5%.

The value of the saturation ratio is temperature dependent. When the irradiation takes place at a low temperature such as liquid $N_2$ (78° K.), the rate of conversion is higher, and also the saturation level is greater (as great as 10% for the $CaF_2$:0.001$Dy^{2+}$ system). When a previously saturated material is warmed up to a higher temperature after irradiation with gamma rays, some of the divalent cations reconvert to trivalent cations, emitting photons in the process (thermoluminescence). The material thereby returns to the equilibrium saturation concentration of divalent cations for the higher temperature. The method can be used to control the divalent lanthanide concentration level in the material. For example, the divalent lanthanide concentration can be lowered by heating the material to a higher temperature where the desired saturation concentration level is in equilibrium. Then, upon cooling it back to the operating temperature, the divalent lanthanide concentration remains stable.

Example 1

An element to be used for the stimulated emission of coherent radiation may be prepared as follows: Fuse one mol calcium fluoride with 0.001 mol dysprosium, as a salt thereof, in a graphite crucible in an oxygen-free ambient, and then cool the fused mass to produce calcium fluoride containing trivalent dysprosium. Then grow a single crystal in an oxygen-free environment, preferably with a high degree of crystallinity, by any of the usual crystal growing techniques. Suitable single crystal bodies may be grown by the Bridgeman technique, either horizontal or vertical. In one application of the Bridgeman technique, a quantity of material is passed through two zones, one of which is maintained about 20° C. above the melting point of the material and the other of which is maintained at temperatures about 20° C. below the melting point of the material. A rate of travel of about 1 inch per 24 hours is adequate. Single crystal bodies may be grown by the Czochralski method. In one application of the Czochralski method, the material is maintained just above the melting point and a crystal is pulled at the rate of 0.25 inch per hour.

The single crystal body is then cut to the desired size and shape. One suitable shape is a rectangular parallelepiped 0.25 x 0.25 x 1.00 inch long. Another is a rectangular circular cylinder 0.188 inch in diameter by 1.00 inch long. In either of these shapes, the opposite minor faces are polished to be plane and parallel. The cut and polished crystal body is then exposed to gamma radiation of about 1 mev. A dose of about $10^6$ to $10^7$ rads is adequate to convert a sufficient proportion of the dysprosium atoms from the trivalent to the divalent state. Some suitable sources of gamma radiation are $Co^{60}$, or spent reactor fuel elements at room temperature. Finally, after exposure, silver mirrors are evaporated on the minor faces of the body. One mirror is totally reflecting and the other mirror is about 10% transmitting.

Example 2

An element to be used for the stimulated emission of coherent radiation may be prepared as follows: Fuse one mol calcium fluoride with 0.0005 mol thulium, as a salt thereof, in an oxygen-free ambient and then cool the fused mass to produce calcium fluoride containing 0.05 mol percent trivalent thulium. Then, grow a single crystal in an oxygen-free ambient preferably with a high degree of crystallinity, by any of the usual crystal growing techniques as described in Example 1. The single crystal body is then cut to the desired size and shape. Some suitable shapes are, as in the previous example, a rectangular parallelepiped 0.25 x 0.25 x 1.00 inch long, and a rectangular circular cylinder 0.188 inch in diameter by 1.00 inch long. In either of these shapes, the opposite minor faces are polished to be plane and parallel. The cut and polished crystal body is then exposed to gamma radiation of about 1 mev. A dose of about $10^6$ to $10^7$ rads is adequate to convert the thulium at room temperature from the trivalent to the divalent state. Finally, silver mirrors are evaporated on the minor faces of the body. One mirror is totally light-reflecting and the other mirror is about 10% transmitting.

Specific reference is hereby made to an application by Zoltan J. Kiss for Luminescent Materials and Luminescent Devices, Ser. No. 197,775, filed May 25, 1962, now abandoned and refiled June 28, 1965, as continuation-in-part application Ser. No. 467,393, and to an application by Zoltan J. Kiss for Element and Device for Generating Coherent Radiation, Ser. No. 199,906, filed June 4, 1962, now abandoned.

What is claimed is:

1. A method comprising growing a crystal from a fused quantity of an alkaline earth halide containing 0.0001 to 1.0 mol percent of at least one lanthanide, said crystal being substantially free of oxygen and characterized by an absorption spectrum lacking an absorption band at about 2000 A., and then exposing said crystal to gamma rays to a dosage of $1 \times 10^5$ to $5 \times 10^7$ rads.

2. A method comprising fusing 0.001 to 0.1 mol percent of at least one lanthanide, as a compound thereof, with an alkaline earth halide in an oxygen-free ambient, solidifying the fused product, preparing a single crystal in an oxygen-free ambient from said solidified product, said crystal being substantially free of oxygen as indicated by the lack of an absorption band at about 2000 A., and then irradiating said crystal with gamma rays to a dosage of $1 \times 10^5$ to $5 \times 10^7$ rads.

3. A method comprising fusing 0.0001 to 1.0 mol percent of dysprosium, as a compound thereof, with calcium fluoride in an oxygen-free ambient, solidifying the fused product, preparing a single crystal in an oxygen-free ambient from said solidified product, said crystal being substantially free of oxygen, and then irradiating said crystal with gamma rays to a dosage of about $10^6$ rads.

4. A method comprising fusing 0.0001 to 1.0 mol percent of thulium, as a compound thereof, calcium fluoride in an oxygen-free ambient, solidifying the fused product, preparing a single crystal in an oxygen-free ambient from said solidified product, said crystal being substantially free of oxygen, and then irradiating said crystal with gamma rays to a dosage of about $10^6$ rads.

References Cited

UNITED STATES PATENTS 3,203,899  8/1965  Fisher _____ 252—301.4 X

OTHER REFERENCES

Guggenheim, Journal of Applied Physics, vol. 32, No. 7 (July 1961), pp. 1337 and 1338.

Pringsheim, Fluorescence and Phosphorescence, 1949, pp. 478–9.

Martin, Chemical and Engineering News, vol. 33, No. 14, April 4, 1955, pp. 1425 and 1428.

HOWARD S. WILLIAMS, *Primary Examiner.*

U.S. Cl. X.R.

260—301.6: 250—84